United States Patent [19]

Mori

[11] Patent Number: 4,953,275

[45] Date of Patent: Sep. 4, 1990

[54] PROCESS FOR MANUFACTURING ALLOY WHEELS FOR VEHICLE TIRES

[76] Inventor: Hiroshi Mori, 2751 Aqua Verde Cir., Los Angeles, Calif. 90077

[21] Appl. No.: 441,888

[22] Filed: Nov. 27, 1989

[51] Int. Cl.$^5$ .............................................. B21D 22/16
[52] U.S. Cl. .................................... 29/894.324; 72/68
[58] Field of Search ................. 72/68, 71, 84, 86, 87; 29/159 R, 159.01, 159.1

[56] References Cited

U.S. PATENT DOCUMENTS

| | | |
|---|---|---|
| 1,041,567 | 10/1912 | Ashton . |
| 1,389,937 | 9/1921 | Cockrill . |
| 1,623,883 | 4/1927 | Michelin ........................ 29/159.01 |
| 2,075,294 | 3/1937 | Le Jeune ........................ 29/159.01 |
| 2,633,765 | 4/1953 | Glasner . |
| 2,868,258 | 1/1959 | Powers . |
| 3,443,411 | 5/1969 | Anthony . |
| 4,142,569 | 3/1979 | Walther et al. . |
| 4,466,670 | 8/1984 | Kaji . |
| 4,532,786 | 8/1985 | Schaible ........................... 72/68 |
| 4,693,104 | 9/1987 | Mori . |
| 4,770,220 | 9/1988 | Mori . |

FOREIGN PATENT DOCUMENTS

| | | |
|---|---|---|
| 326477 | 12/1919 | Fed. Rep. of Germany . |
| 10385 | 1/1980 | Japan . |
| 522399 | 6/1940 | United Kingdom . |
| 718076 | 11/1954 | United Kingdom . |

Primary Examiner—Lowell A. Larson
Attorney, Agent, or Firm—Lyon & Lyon

[57] ABSTRACT

A process for forming an alloy vehicle wheel from a plate of a cast or forged alloy material including the steps of roll-forming a perimeter portion of the plate to draw material in the perimeter portion radially outwardly therefrom and reduce the transverse dimension of the perimeter portion, bifurcating the roll-formed perimeter portion of the plate into a pair of opposed flared end portions, and spin forming the flared end portions to define the outer and inner rim portions of the wheel and the outer and inner rim flanges thereof.

14 Claims, 4 Drawing Sheets

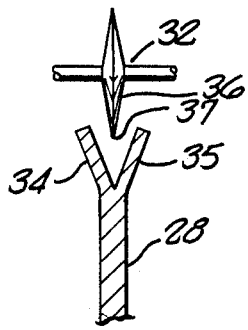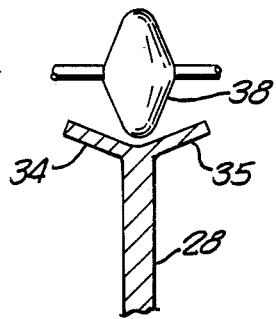
fig.5.   fig.6.
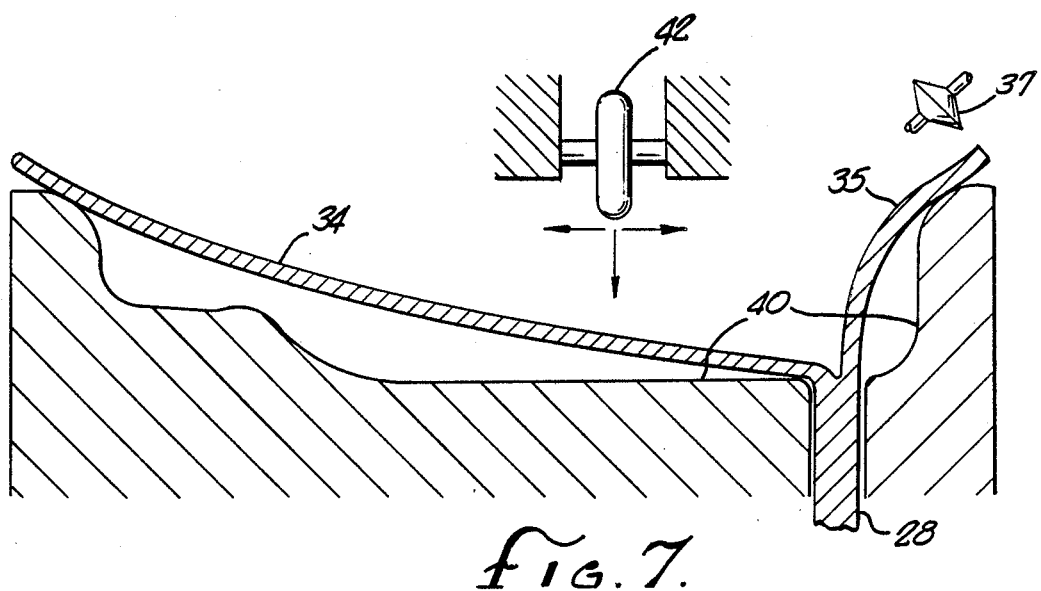
fig.7.
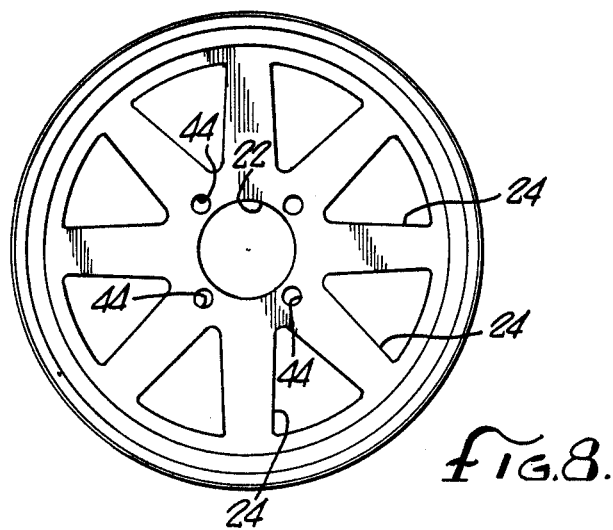
fig.8.

PROCESS FOR MANUFACTURING ALLOY WHEELS FOR VEHICLE TIRES

BACKGROUND

The present invention relates to a method of manufacturing one and two piece alloy wheels for vehicle tires. Alloy vehicle wheels and in particular aluminum alloy wheels are quite popular due to their aesthetic appearance and light weight. Because aluminum alloys are not readily susceptible to welding due to the deleterious effect of the welding process on the strength of the metal, it has been standard practice to manufacture separately the disc or wheel center and the inner and outer rims and subsequently to assemble the component parts by a suitable fastening means such as a plurality of threaded bolts. Such wheels are commonly referred to as three-piece wheels.

Three-piece wheels generally comprise superimposed radially directed flanges extending from the inner and outer rims which are secured to a peripheral mounting on the wheel center by the fastening means. The advantage of a three-piece wheel is economy of repair. If one of the parts of the wheel is damaged, that part can be replaced without having to replace the entire wheel. However, inadequate strength and leakage are problems inherent in such structures. Inadequate strength results from the mechanical assembly and the tolerances required in the manufacture of such wheels which generally result in an imperfect alignment, adversely affecting wheel strength.

In addition to the obvious safety problems, inadequate strength has prevented such wheels from employing a desirable positive wheel offset which is highly advantageous, particularly for front drive vehicles, as it provides greater area for larger breaking drums for improved breaking performance while complying with existing wheel placement regulations. In an effect to solve these problems, numerous different three-piece wheel configurations have been developed. For example, U.S. Pat. No. 4,466,670 teaches a configuration which provides improved strength characteristics over previously developed three-piece wheels and employs a silicon seal to prevent leakage. U.S. Pat. No. 4,770,220 employs a rim design which provides sufficient strength to maximize the positive wheel offset. Nevertheless, regardless of the design, the necessity to manufacture and subsequently securement together the inner and outer rims in three-piece wheel designs necessarily increases the cost of manufacture and does not adequately address the problem of untrue alignment.

U.S. Pat. No. 4,693,104 provides a solution to the cost problem inherent in three-piece wheel construction by teaching a method of manufacturing a single piece aluminum alloy rim for use with conventional alloy wheel centers which reduces assembly time and the cost of manufacture while maximizing strength. However, the method disclosed therein requires the use of high pressure dies capable of exerting about 6,000 tons of pressure to form the wheel. While providing an excellent product and reducing the cost of manufacture as compared to three-piece wheels and correcting the problem of part alignment, the cost of the manufacturing equipment for such a process may be considered high for some manufacturers and the resultant two-piece wheel still requires an additional assembly step. It would therefore be highly desirable to develop a method of manufacturing an alloy wheel which would continue to provide a superior light weight product and true alignment, but which would further reduce the cost of manufacturing. The method of manufacture disclosed herein provides such a wheel.

SUMMARY OF THE INVENTION

Briefly, the present invention comprises the steps of roll-forming a perimeter portion of a circular cast or forged alloy plate to draw the perimeter portion of the plate radially outwardly, thinning and strengthening the perimeter portion; radially bifurcating the perimeter portion of the plate to define a pair of opposed flared annular end portions; spin forming one of said end portions to define a outer rim portion and an outer rim flange; and spin forming the other of said end portions to define an inner rim portion and an inner rim flange; and forming the desired apertures in the wheel center to create the axle bore and desired wheel center appearance.

It is the principal object of the present invention to provide an economic method for manufacturing a precisely aligned, alloy wheel for vehicle tires.

It is another object of the present invention to provide a method of manufacturing a precisely aligned, light weight alloy wheel for vehicle tires which is of one or two piece construction.

It is yet another object of the present invention to provide a method of manufacturing a precisely aligned, structurally sound one or two piece alloy wheel for vehicle tires from a cast alloy plate.

It is a further object of the present invention to provide a method of manufacturing a precisely aligned structurally sound one or two piece alloy wheel for vehicle tires from a forged alloy plate.

It is a still further object of the present invention to provide a method of manufacturing a structurally sound single-piece alloy wheel for vehicle tires from a cast or forged alloy plate having a thin walled and light weight wheel rim.

These and other objects and advantages of the present invention will become readily apparent from the following detailed description taken in conjunction with the accompanying drawings.

BRIEF DESCRIPTION OF THE DRAWINGS

FIG. 5 is a schematic representation of the bifurcating of the perimeter portion of the roll-formed plate to define the opposed flared end portions.

FIG. 6 is a schematic representation of spreading of the bifurcated flared end portions.

FIG. 7 is a schematic representation of the spin forming of one of the opposed flared end portions to define a rim portion and a rim flange.

FIG. 8 is a side view of formed wheel after drilling of the wheel center.

DESCRIPTION OF THE PREFERRED EMBODIMENT

Figure 1:
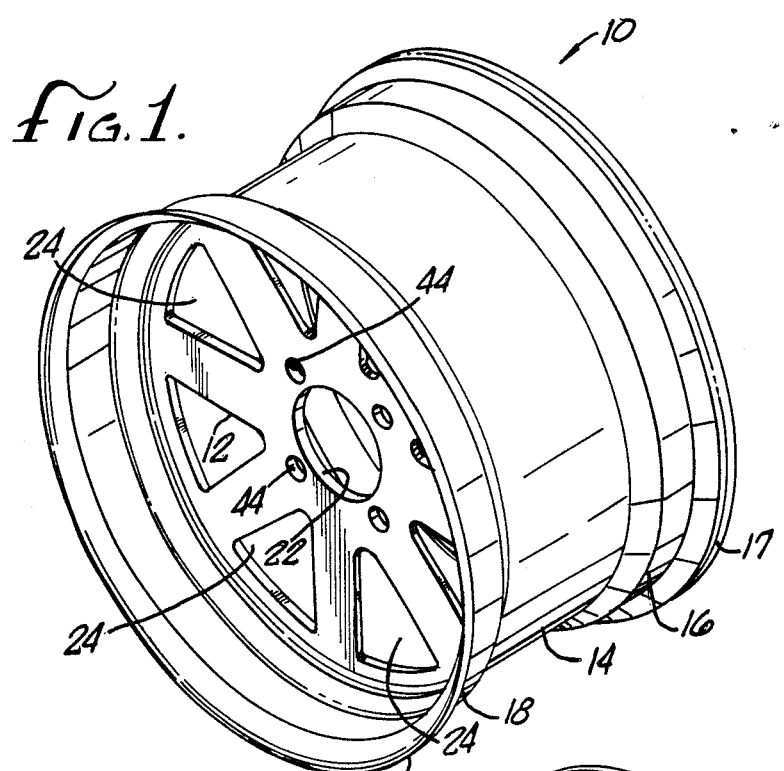
FIG. 1 is a prospective view of an alloy vehicle wheel constructed in accordance with the present invention.

The single piece alloy wheel 10 of the present invention comprises a wheel center 12 and rim 14. Rim 14 defines an inner rim portion 16 terminating in an inner rim flange 17 and an outer rim portion 18 terminating in an outer rim flange 20. The wheel center 12 defines an axle bore 22 for receiving a vehicle axle and generally includes a plurality of decorative apertures 24 therein which give the wheel 10 its desired ornamental appearance.

Figure 2:
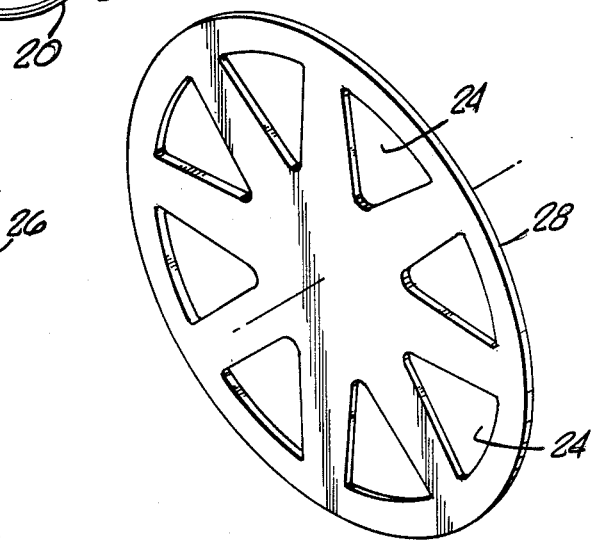
FIG. 2 is a prospective view of a cast or forged alloy plate from which the vehicle wheel is formed.
Figure 3:
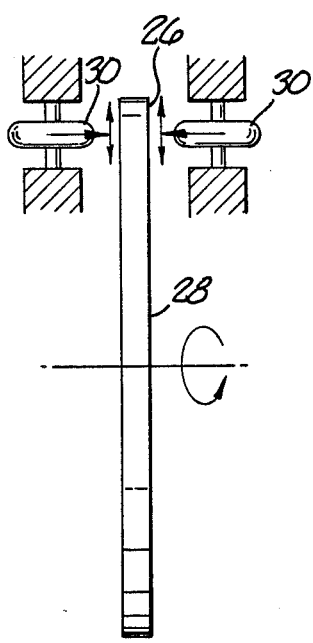
FIG. 3 is a schematic representation of the roll-forming of the perimeter portion of the plate.
Figure 4:
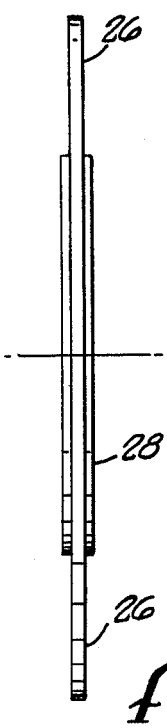
FIG. 4 is a perspective view of the cast or forged alloy plate after roll-forming.
Figure 9:
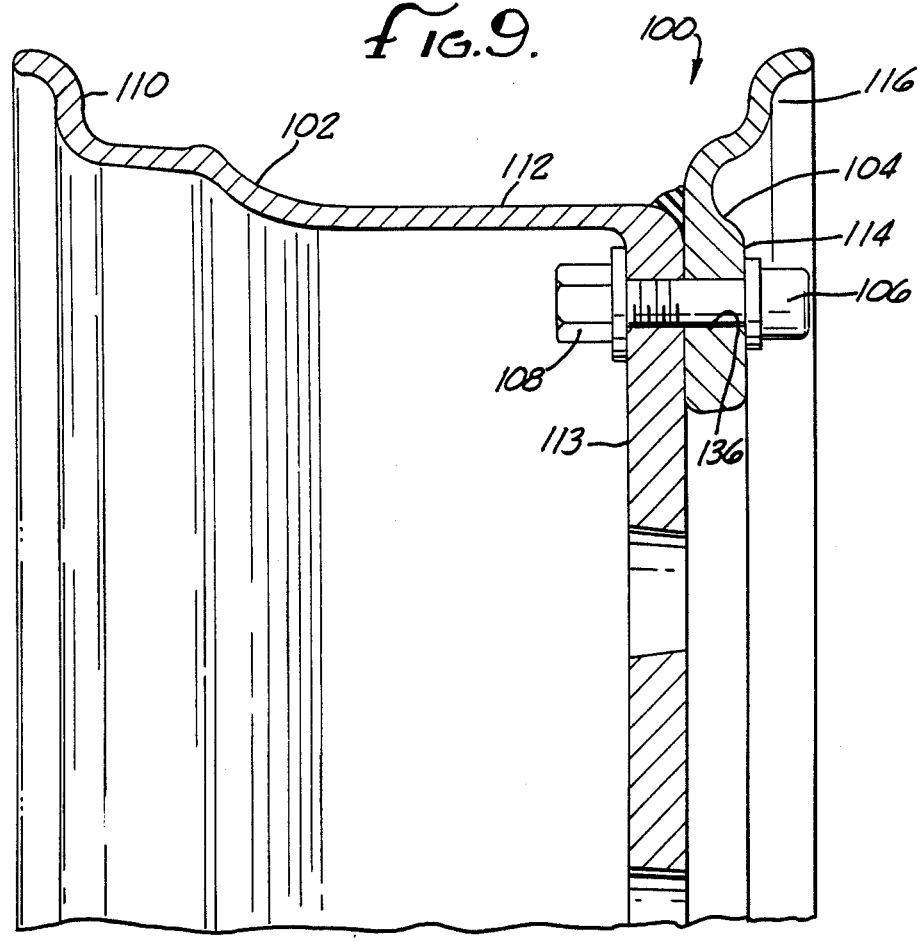
FIG. 9 is a fragmentary sectional view of a second embodiment of the present invention.
Figure 10:
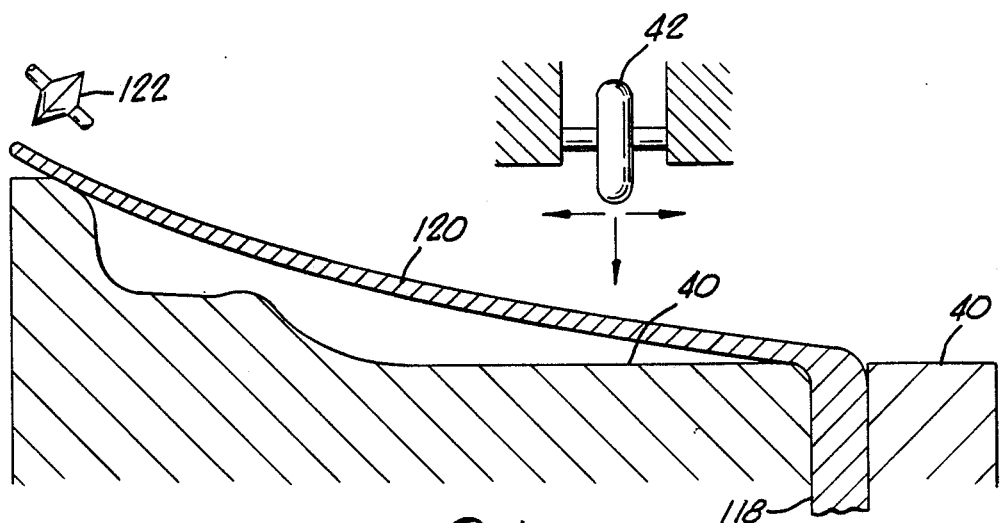
FIG. 10 is a schematic representation of the spin forming of the rolled portion of a cast or forged plate illustrated in FIG. 4 to form the inner rim flange of the second embodiment of the present invention.
Figure 11:
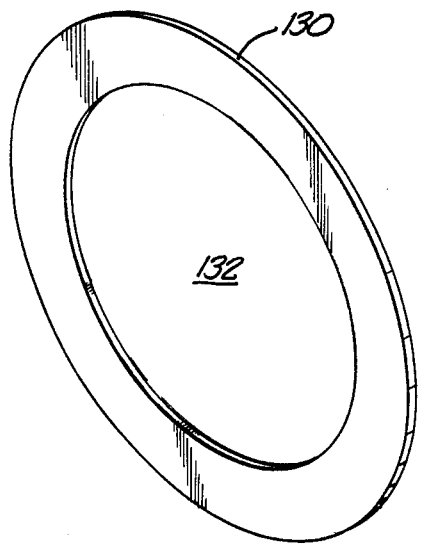
FIG. 11 is a perspective view of the disc from which outer portion of the wheel of the second embodiment is formed.
Figure 12:
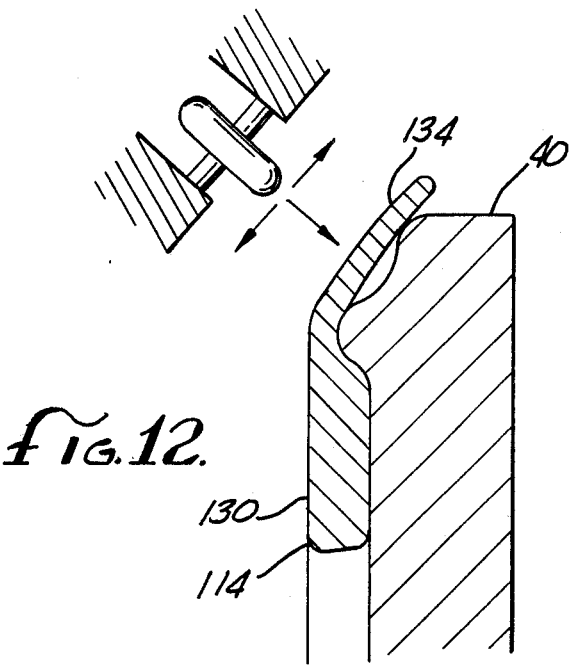
FIG. 12 is a schematic representation of the spin forming of a rolled disc member to form the outer rim flange of the second embodiment of the present invention.

The process for manufacturing alloy wheel 10 is illustrated in FIGS. 3-7. As illustrated in FIG. 3, the perimeter portion 26 of a cast alloy plate 28 (illustrated in FIG. 2 and preferably constructed of an aluminum alloy) is roll-formed by pressure rollers 30 to draw the material in the perimeter portion 26 radially outwardly, reducing the transverse dimension of the perimeter portion so as to define the plate configuration illustrated in FIG. 4. By pressure rolling the perimeter portion 26 of the cast plate, that portion is significantly strengthened and made more ductile, overcoming the inherent weakness and brittleness inherent in casting and allowing that portion to be subsequently formed into a structurally sound wheel rim. It should be noted that while plate 28 is preferably of a cast construction to reduce the cost of manufacture, the plate 28, if desired, could alternatively be of a forged construction.

The thinned perimeter portion 26 of the roll-formed plate is then bifurcated by a suitable knife roller 32 to form a pair of annular end portions 34 and 35. The knife roller 32 defines tapered side walls 36 extending outwardly from the cutting edge 37 thereof to flare the bifurcated end portions 34 and 35 outwardly a illustrated in FIG. 5. A tapered spreader roller 38 schematically illustrated in FIG. 6, can also be employed in conjunction with the knife roller 32 to spread the bifurcated end portions 34 and 35 of plate 28 further apart to facilitate the forming of end portions into the wheel rim. To obtain the desired wheel width and positive wheel offset, the end portions 34 and 35 are trimmed, as needed, by a suitable trimming device (schematically illustrated at 37 in FIG. 7) to a desired length. By positive wheel offset is meant the distance between the outer rim flange and the wheel center less the distance between the wheel mounting face and the outer rim flange.

As is also illustrated in FIG. 7, the alloy plate 28 with its flared end portions 34 and 35 is then subjected to a conventional metal spinning process employing one or more forming dies 40 and associated moveable rollers 4 to impart the desired curvature to the end portions to define the wheel rim 14. End portion 35 is thus formed into the outer rim portion 18 and outer rim flange 20 and end portion 34 is formed into the inner rim portion 16 and inner rim flange 17. The center axle bore 22, lug bolt apertures 44, and any other desired apertures not already formed into the wheel center 12 during the casting or forging of plate 28 are then drilled axially therethrough. When plate 28 is originally formed by a casting process, a wide variety of sizes and shapes of decorative apertures and/or indentations can readily be formed in the center portion of the plate 28 during the casting process to provide the wheel center 12 with its desired aesthetic appearance. Such apertures and/or indentations could, of course, also be formed in a forged plate, albeit at greater cost.

The aforesaid process allows for the use of the casting process in the formation of the circular plate 28 and thus retains all of the economic advantages and versatility of the casting process, while providing a structurally sound, integrally formed, thin and light wheel rim not otherwise obtainable through conventional casting procedures.

FIGS. 9-12 illustrate a second embodiment of the present invention wherein the above described process is utilized to form a two-piece wheel 100 which retains the benefits of the above described single piece wheel 10. Wheel 100 is comprised of an inner wheel portion 102 and outer wheel portion 104 joined together by a plurality of bolts 106 and nuts 108. Inner wheel portion 102 defines the inner rim flange 110, spanning rim portion 112 and wheel center 113. Outer wheel rim portion 104 defines an annular radial flange 114 and outer rim flange 116.

Inner portion 102 of wheel 100 is formed from a circular cast or forged alloy plate 118 as wheel 10 of the prior embodiment. The perimeter portion 120 of plate 118 is first roll formed as plate 28 in FIGS. 3 to provide a configuration like that illustrated in FIG. 4. Unlike in the prior embodiment, the rolled perimeter portion 120 of plate 118 is not bifurcated as only a single rim flange is to be formed from the plate. Accordingly, perimeter portion 120 is subjected to a spinning and trimming process, illustrated in FIG. 10, to form the rolled perimeter portion into the desired configuration of inner rim flange 110 and rim spanning portion 112, while the remainder of inner portion 102 defines the wheel center 113. The trimming device 122 severs any excess material from the inner rim flange 110 and the inner thickness of the rim spanning portion 112 and inner rim flange is determined by the pressure exerted by forming dies 40 in the roll forming step.

The outer portion 104 of wheel is similarly formed, but from an annular cast or forged disc 130 defining an enlarged circular opening 132 therein (see FIG. 11) as opposed to the solid plate 118 to draw the material in the perimeter portion 134 radially outward, reducing its tranverse dimension, strengthening and rendering the rolled portion more ductile. The roll formed perimeter portion is then subjected to a spinning process, illustrated in FIG. 12, to form the outer rim flange 116, while the remaining unrolled portion of disc 130 defines an annular radial flange 114. Aligned Apertures 136 are then drilled through the inner and outer portions 102 and 104 of wheel 100 adjacent the perimeter portion of the wheel center 113 and through radial flange 114 respectively. The formed portions 102 and 104 are then secured together by bolts 106 and nuts 108 to form the two piece wheel 100. It is to be understood that the wheel center 113 could also be formed as part of the outer wheel portion 104 as opposed to being part of the inner wheel portion 102. In such case, the outer wheel portion would be formed from a circular plate and the inner wheel portion would be formed from the annular disc. Further, as in the prior embodiment of the single-piece wheel, as the wheel center 113 is formed from a plate, it could be provided with a wide variety of sizes and shapes of decorative apertures and/or indentations which can be readily formed when the plate is of a cast construction.

Various changes in modifications may be made in carrying out the present invention without departing from the spirit and scope thereof. Insofar as these changes and modifications are within the purview of the appended claims, they are to be considered as part of the present invention.

What is claimed:

1. A process for forming a single-piece vehicle wheel comprising the steps of:
   roll-forming a perimeter portion of a circular plate to draw material in the perimeter portion radially outwardly therefrom and reduce the transverse dimension of said perimeter portion;
   bifurcating the roll-formed perimeter portion of the plate to define a pair of annular end portions;
   spreading the annular end portions such that the end portions flare outwardly in opposed directions; and
   bending the flared end portions to define outer and inner rim portions and outer and inner rim flanges.

2. The process of claim 1 including the step of drilling said plate to define one or more apertures therein.

3. The process of claim 1 including the step of trimming at least one of the flared end portions to provide said end portions with predetermined lengths to define the wheel width and amount of positive offset.

4. The process as in claims 1, 2, or 3 wherein the plate is formed of a cast alloy material.

5. The process as in claims 1, 2 or 3 wherein the plate is formed of a forged alloy material.

6. A process for forming a single-piece alloy vehicle wheel from a circular plate of an alloy material, said process comprising the steps of:
   roll-forming a perimeter portion of the plate to draw material in the perimeter portion radially outwardly therefrom and reduce the transverse dimension of said perimeter portion;
   bifurcating the roll-formed perimeter portion of the plate to define a pair of annular end portions;
   spreading the annular end portions such that said end portions flare outwardly in opposed directions;
   trimming at least one of said end portions to provide said end portions with predetermined lengths; and
   spin forming the flared end portions to define outer and inner rim portions and outer and inner rim flanges.

7. The process of claim 6 including the step of drilling said plate to define one or more apertures therein.

8. The process as in claims 6 or 7 wherein the plate is formed of a cast alloy material.

9. The process as in claims 6 or 7 wherein the plate is formed of a forged alloy material.

10. A process forming a two-piece vehicle wheel comprising the steps of:
    roll-forming a perimeter portion of a circular plate to draw material in the perimeter portion radially outwardly therefrom and reduce the transverse dimension of said perimeter portion;
    bending the roll-formed perimeter portion of the plate to define a first rim flange and a rim spanning portion;
    roll-forming a perimeter portion of an annular disc to draw material in the perimeter portion radially outwardly therefrom and reduce the tranverse dimension of said perimeter portion of said disc;
    bending the roll formed perimeter portion of the disc to define a second rim flange; and
    securing together said plate and said disc such that said rim spaning portion extends horizontally between said first and second rim flanges to define said wheel.

11. The process of claim 10 including the steps of drilling said plate and said disc to define a plurality of apertures therein and wherein the securement step comprises aligning the drilled apertures in said plate with the drilled apertures in said disc, extending bolt members through said aligned apertures, and threadably engaging nuts onto each of said bolt members.

12. The process of claim 10 including the steps of trimming the rolled perimeter portions of said plate and/or said disc to predetermined lengths to define the wheel width and amount of positive offset.

13. The process as in claims 10, 11 or 12 wherein the plate and disc are formed of a cast alloy material.

14. The process as in claims 10, 11, or 12 wherein the plate and disc are formed of a forged alloy material.

* * * * *